G. Vale,
Astronomical Globe.
Nº 3,318.  Patented Oct. 28, 1843.
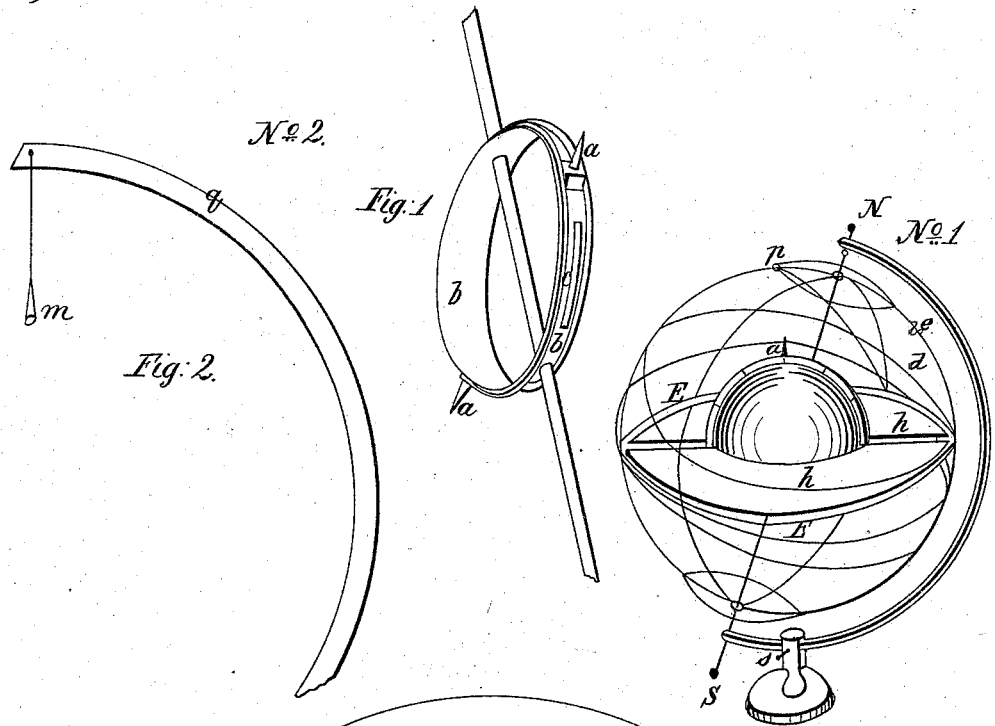
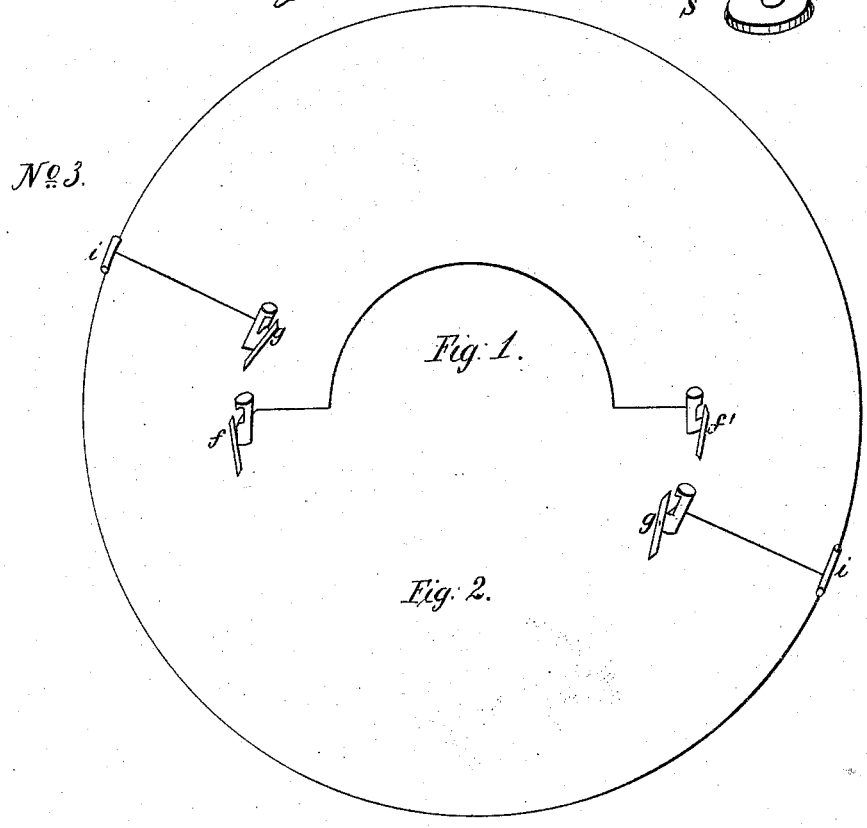

UNITED STATES PATENT OFFICE.

GILBERT VALE, OF NEW YORK, N. Y.

GLOBE.

Specification of Letters Patent No. 3,318, dated October 28, 1843.

*To all whom it may concern:*

Be it known that I, GILBERT VALE, of New York, in the county and State of New York, have invented a new Instrument for Illustrating Astronomical Phenomena; and I do hereby declare that the following is a full and exact description.

In the center of the instrument is an ordinary globe (terrestrial) as represented in the drawing No. 1, which accompanies this specification. To this globe a universal meridian, having a figure *a* at the top representing a traveler, and a similar figure at the bottom (not shown or necessary in the drawing) representing the antipodes to *a*. To this meridian is attached a broad plate representing the horizon to such figure, and marked *h, h,* in the drawing No. 1. The outer circles of the sphere represent the great circles in the heavens, together with the Tropics, the Arctic and Antarctic Circles. The stand and exterior semi-circle serve to support the sphere, and to adjust it, as the semicircle slides through the support, and is fastened by a screw at *s* (as the instrument or sphere can be supported in various ways the manner is not essential).

The universal meridian is formed of two circles, one on each side the axis (see drawing No. 2, Figure 1) and connected by the travelers *a, a,* by rivet, casting or any other means. To prevent friction on the globe they (the circles forming the universal meridian) ride on a thin plate of brass or other material, as seen at *b* drawing 2, Fig. 1, and a slit *c* in this thin plate serves to give the true meridian, and to show it on the terrestrial globe within; but the thin plate is not essential to the principle of the instrument as other methods will serve to avoid the friction of the two circles united by the travelers material, as seen at *b,* drawing 2, Fig. 1, and *a a.* By this arrangement the two circles united by the travelers *a a* (drawing 2, Fig. 1) can move north or south on the thin plate, or globe, and carry with them the traveler, as far as the axis of the instrument or poles of the earth; and as this universal meridian will move also on its axis, east or west, it enables the traveler to go to, or be put over any part of the earth, accessible to man; and as the horizon is attached (see drawing 1, *h*) to the universal meridian at ninety degrees (90°) from the traveler, this horizon will move also, as in nature, and this movable horizon, attached to the meridian and accompanying the traveler, is the most essential part of the invention, for by this most of the problems in popular astronomy are performed. This horizon is made in two halves as represented in drawing No. 1, to enable it to pass by the axis when necessary.

To the outer sphere I attach the celestial globe in sections of any number as $\frac{1}{8}$, $\frac{1}{4}$, &c., an eighth section is represented in drawing 1 at *d,* resting on the ecliptic E E and concentrating at the pole of the ecliptic marked *p* in drawing No. 1. These sections may be made of glass painted, copper perforated, paper rendered transparent, or other materials; that which I use as best adapted is paper, the same which covers our common celestial globes and rendered transparent and tough by oils and varnish, and kept globular by a frame of metal, paper or other materials; each section is fastened to the supporting circles by one or more clasps, or by the common hook, (of the hook and eye) which I use as all that is necessary (see *e* drawing No. 1) and one or more sections may be used as may be wanted.

The problems usually performed by our common globes, are performed by this instrument thus fitted up, agreeable to nature, together with a variety of other problems in sun dialing, and spherical trigonometry, peculiar to itself.

To use this instrument as a planetarium, I bring the horizon to coincide with the ecliptic E E as in drawing No. 1, which horizon then becomes the plane of the ecliptic and the globe in the center must be considered the sun, and may be covered with a brass or gilt basin to represent the sun (but which basin, not being a part of the instrument or essential, is not represented). The ecliptic then becomes the passage of the earth, and all the phenomena of such a passage can be represented by any small globe. To represent the inferior planets I use a curved wire, drawing 3 Fig. 1. This I attach to the ecliptic in the inside by the buttons *f, f;* the points of the ecliptic to which the wire is attached show the nodes of such inferior planet, and as any inclination can be given to this wire, the exact inclination of Venus or Mercury can be given, and the phenomena of such planet shown, and as this curved wire can be placed either above or below the plane of the ecliptic, it may always represent that part of the orbit in which the planet is.

To represent the superior planets, I use the large circular wire (drawing No. 3, Fig. 2), and this I attach to the outside of the ecliptic by the buttons $g\ g$. This curved wire for conveniency of packing only, is made in two parts and united by the small tubes $i\ i$. It can receive any inclination and consequently the inclination of the planet whose orbit it is made to represent and it then shows the nodes and inclinations of such planets. More wires can be introduced if thought necessary by lengthening the stems $i\ g$, and employing larger circles, but for illustration one is sufficient.

Fig. 2, drawing 2, represents the quadrant of altitude; it is used with the instrument when representing the terrestrial and celestial globes, by placing the hollow cone $m$ over the traveler $a$ which will raise the quadrant $q$, above the sphere about which it will revolve.

What I claim especially as my invention is—

1. The movable horizon attached to the meridian and moving as the figure representing the traveler moves.

2. I claim also the application of the celestial globe in sections rendered transparent to the sphere as explained in the specification. I also claim the application of this instrument as a planetarium, by the introduction of wires representing the orbits of the planets and showing their nodes and inclinations, as explained in the specification.

The instrument may be made of various materials, and mounted in a variety of forms, without affecting its essential qualities.

G. VALE.

Witnesses:
MILN PARKER,
AMOS C. MOREY.